April 12, 1960 G. L. GOETHE 2,932,100
LAND CLEARING AND BRUSH RAKING ATTACHMENT
FOR TRACK TYPE TRACTORS
Filed March 4, 1955 3 Sheets-Sheet 1
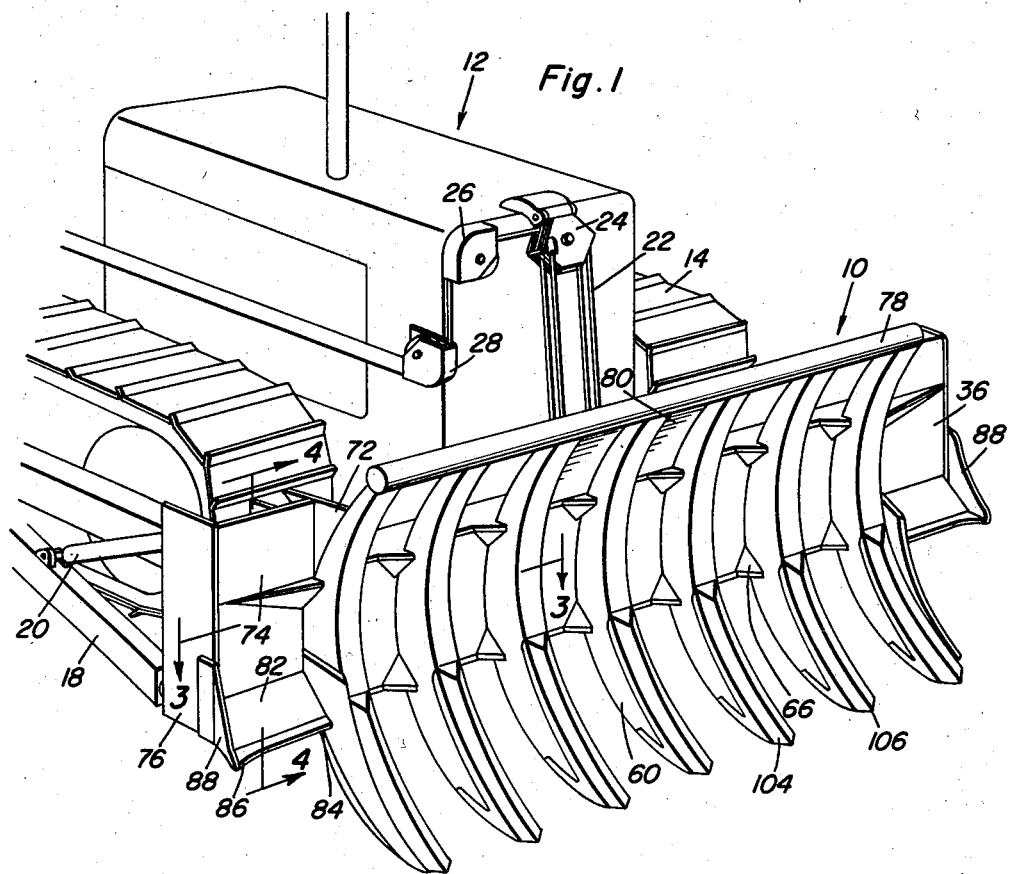
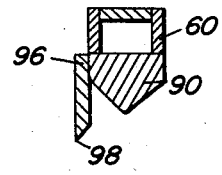
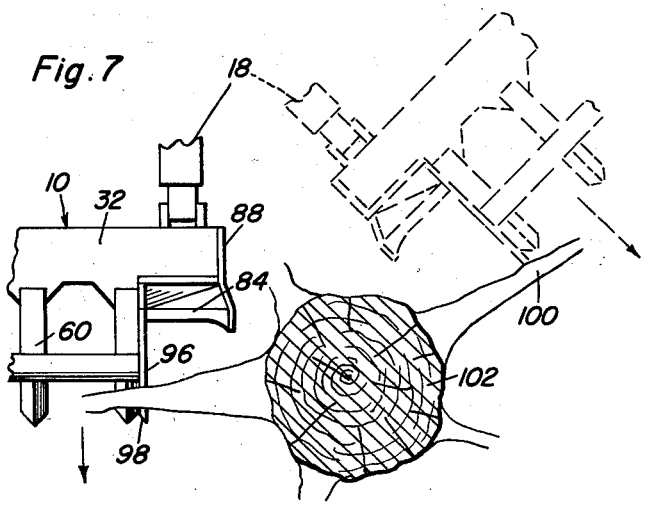
George L. Goethe
INVENTOR.

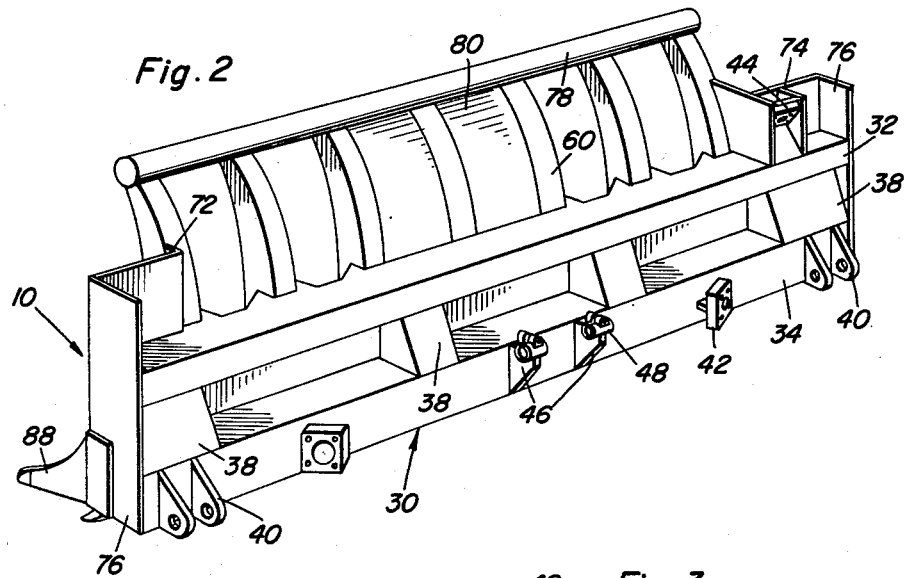
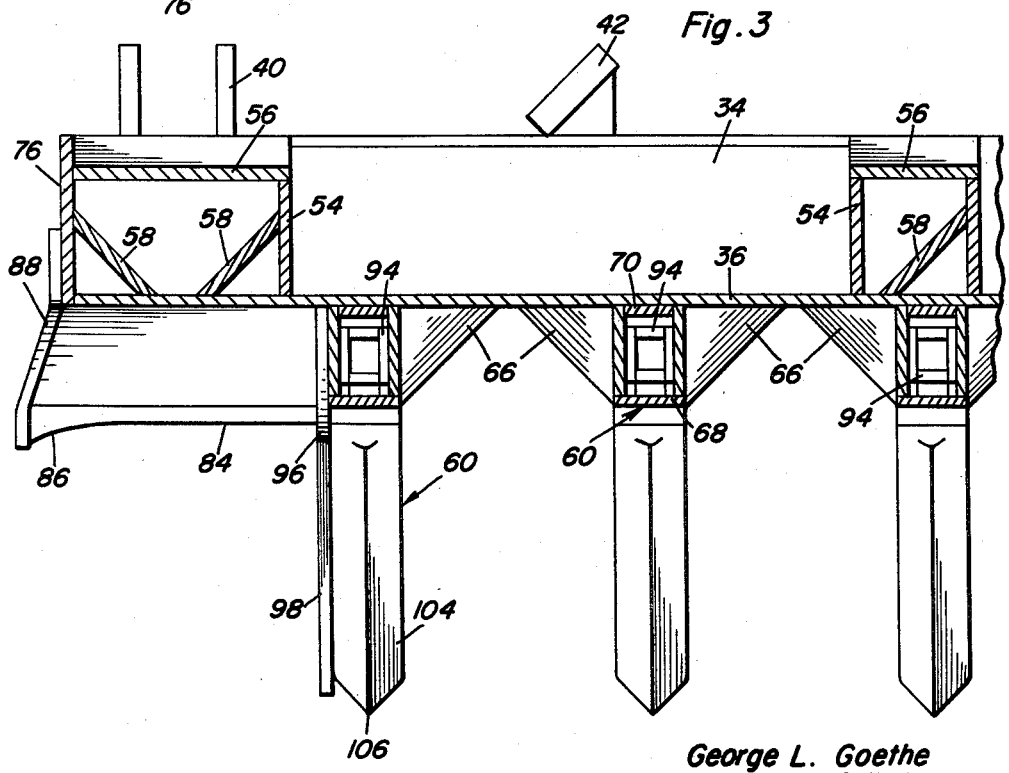
George L. Goethe
INVENTOR.

April 12, 1960  G. L. GOETHE  2,932,100
LAND CLEARING AND BRUSH RAKING ATTACHMENT
FOR TRACK TYPE TRACTORS
Filed March 4, 1955  3 Sheets-Sheet 3
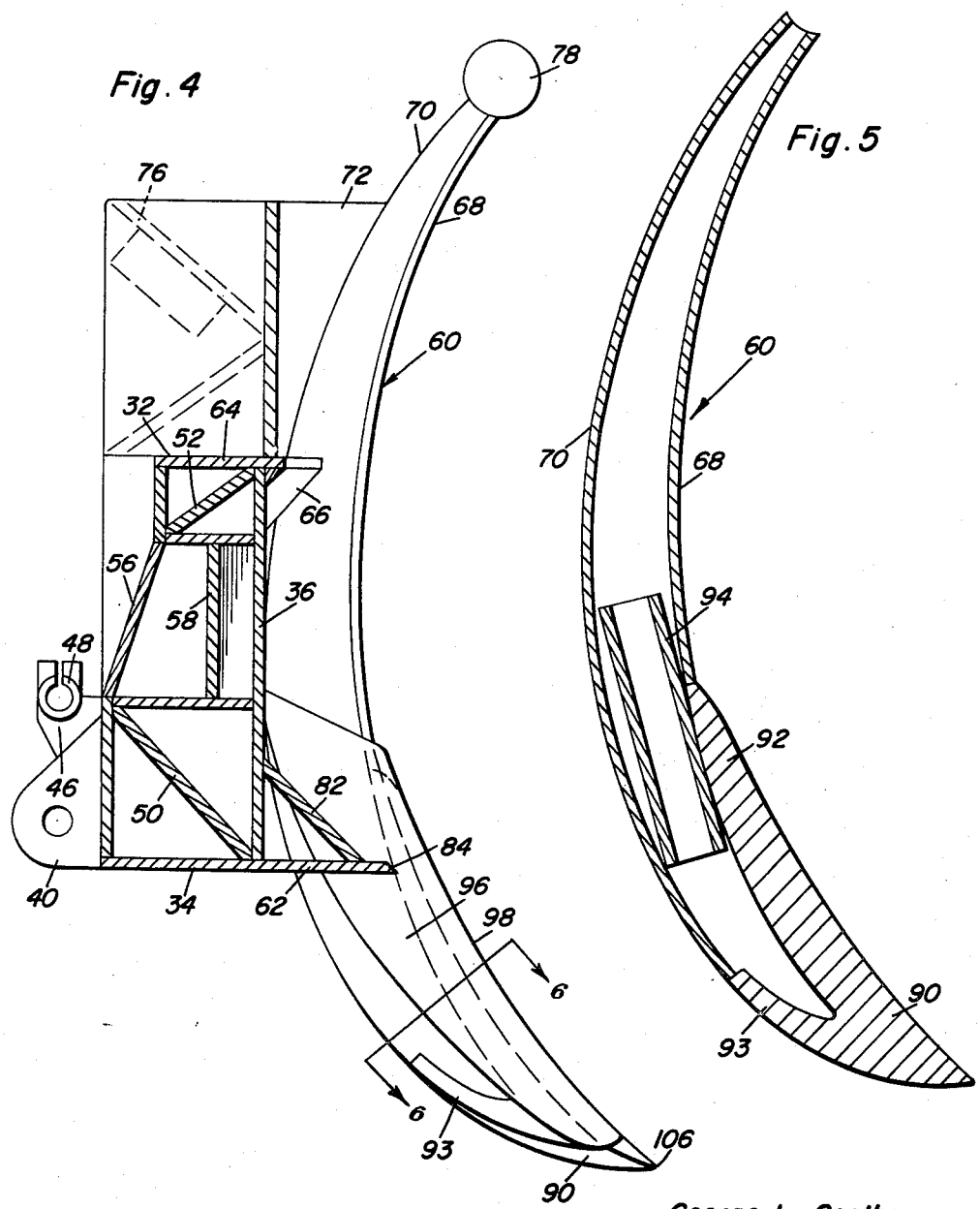
George L. Goethe
INVENTOR.

United States Patent Office 2,932,100
Patented Apr. 12, 1960

2,932,100

LAND CLEARING AND BRUSH RAKING ATTACHMENT FOR TRACK TYPE TRACTORS

George L. Goethe, Brooksville, Fla.

Application March 4, 1955, Serial No. 492,100

10 Claims. (Cl. 37—2)

This invention generally relates to an attachment for tractor type vehicles, and more specifically provides a device for utilization in land clearing in which it is desirable to remove rocks, stumps, trees and brush from the land to a given area for burning or hauling away so that the land may be used for other purposes, such as planting crops or constructing buildings, roads or the like.

Previously, the land clearing operation has been conducted with the usual type of bulldozer blade attached to a track type tractor having a push yoke mounted thereon. The use of these blades is objectionable since a relatively large quantity of soil is gathered and the roots and rocks occurring in the soil are not effectively removed. Also, it was necessary for a relatively large tractor to be used in removing relatively small trees and other obstructions since the attachment itself was extremely heavy and did not operate efficiently. Recently, there has been some development in attachments for tractors for this specific purpose, as illustrated by Patent No. 2,491,208, issued December 13, 1949. This type of device is provided with a plurality of teeth together with a frame therefor which engages the soil for clearing the land. Accordingly, it is the primary object of the present invention to provide an improved and novel construction in a land clearing and brush raking attachment for track-type tractors which is extremely light, rigid and rugged in construction, more efficient in operation, more versatile in utility, stronger in all of its component elements, easy to attach and control, more effective, relatively inexpensive to manufacture and maintain and otherwise well adapted for its intended purposes.

Another object of the present invention is to provide an attachment as set forth in the preceding object in which a plurality of arcuately curved teeth are utilized wherein such teeth are of hollow box-like construction which may or may not be equipped with box-like reinforcement therein whereby the teeth are stronger than the solid cast type teeth but yet extremely light and in which the teeth are provided with a ground engaging pointed toe which may be removed and renewed in an easy manner.

Still another object of the present invention is to provide an attachment conformable to the preceding objects in which the attachment is provided with a pair of horizontal blades curved forwardly and outwardly at each end of the attachment for biting into trees or stumps for pushing the same over and preventing the attachment from riding up the tree or stump.

Another feature of the present invention is the provision of an attachment including a pair of generally vertically disposed knives which may be utilized for splitting stumps or cutting roots since the blades are disposed on the outermost teeth of the attachment.

Another important feature of the present invention is the provision of a framework for supporting a plurality of teeth in an attachment of the type previously set forth wherein the framework is constructed of hollow box-like members having diagonal reinforcements, thereby forming an extremely rigid but yet light construction.

A still further object of the present invention is to provide an attachment as previously set forth in the preceding objects in which all of the component elements facing the material to be moved by the attachment are relatively smooth, thereby eliminating deposit of soil or other objects on projecting ledges.

Another very important object of the present invention is the provision of an attachment as set forth previously in which the plurality of teeth are provided with a concave or arcuate front surface which is a portion of a complete circle whereby the material gathered by the teeth will be rolled during the gathering operation, thereby shaking and removing substantially all of the soil from the roots of stumps and trees.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the land clearing and brush raking attachment of the present invention attached to an endless track type of tractor;

Figure 2 is a rear perspective view showing the attachment per se and showing the vertically spaced cross-members or frame members together with the relationship of the teeth to the frame members;

Figure 3 is a fragmental, plan sectional view taken substantially upon a plane passing along section line 3—3 of Figure 1 showing the details of construction of the teeth together with the bracing members between the frame members;

Figure 4 is a transverse, vertical sectional view taken substantially upon a plane passing along section line 4—4 of Figure 1 showing the construction of the frame members together with the relationship thereof of the rake teeth and the supporting means therefor;

Figure 5 is a vertical, longitudinal sectional view taken substantially through the longitudinal center of one of the arcuate teeth showing the construction thereof and illustrating the position of the reinforcing box member together with the position and shape of the pointed toe on the lower end thereof;

Figure 6 is a plan sectional view taken substantially upon a plane passing along section line 6—6 of Figure 4 showing the construction of the lower portion of the tooth together with the position of the blade attached thereto; and Figure 7 is a diagrammatic plan view showing the manner in which the vertical blade is utilized to cut roots extending from opposite sides of a tree after which the tree may be more easily pushed over.

Referring now specifically to the drawings, it will be seen that the numeral 10 generally designates the land clearing and brush raking attachment of the present invention which is adapted to be attached to a track type tractor generally designated by the numeral 12 and including endless treads 14 driven in the usual manner together with pivotally mounted support arms 18, brace members 20 extending inwardly from the central portion of the support arms 18 together with a flexible cable 22 positioned over pivotally mounted cable pulley blocks 24, 26 and 28 wherein the cable 22 may be retracted or extended for controlling the position of the attachment 10. The details of construction of the tractor 12 together with the control cable 22 and the support arms 18 and braces 20 form no actual part of the invention, and it will be understood that the invention may be attached to any type of tractor or vehicle suitable for the purposes intended.

The brush raking attachment 10 of the present invention generally includes a frame generally designated by the numeral 30 which includes an upper or top cross-frame member 32 and a bottom or lower frame member 34 which are normally disposed in generally transverse horizontal and parallel relation. The forward edge of the frame members 32 and 34 are interconnected by a generally vertically disposed interconnecting plate 36. The cross-members or frame members 32 and 34 are interconnected on their inner surfaces by vertically extending box brace members 38. The lower cross-member 34 is provided with a plurality of pairs of rearwardly extending lugs 40 for pivotal attachment to the support arms 18 and also brackets 42 for attachment to the brace member (not shown). Also, a bracket 44 is positioned above the upper member 32 for attachment to the adjustable brace member 20 wherein the position of the attachment 10 may be adjusted about substantially a horizontal axis formed by the pivotal connection between the support arms 18 and the attachment 10. Also, the lower or bottom cross-member 34 is provided with rearwardly extending lugs 46 having horizontally aligned tubular sleeves 48 therein for receiving a bar to which the cable 22 is attached. The details of this bar are not illustrated, although it will be understood that any type of connection may be utilized between the cable 22 and the attachment 10 for raising and lowering the attachment 10 about the pivotal axis formed by the support arms 18.

Referring now specifically to Figure 4, it will be seen that the lower frame member of cross-member 34 is of hollow, generally rectangular construction wherein the plate 36 forms the front wall thereof and the frame member 34 is provided with bottom, top and side walls forming a rigid box-like tubular construction and a rigidifying diagonal plate 50 is provided which forms a reinforcement for the lower member 34. The upper member 32 is also of tubular box-like hollow construction, having a diagonal reinforcing plate 52 therein which extends throughout the length of the upper member 32 and the brace plates 50 and 52 are diagonally positioned, thereby forming an extremely rigid construction for the frame members 32 and 34 but yet permitting the frame members 32 and 34 to be relatively light in weight.

Referring now specifically to Figure 3, it will be seen that the vertical brace members 38 are each provided with side walls 54 and a forwardly inclined rear wall 56. The outermost of the brace members 38 are somewhat larger than the innermost and are provided with a pair of reinforcing plates 58 which extend across the forward corners of the hollow box-like reinforcing braces 38. The innermost of the brace members 38 are provided with only a single reinforcing plate 58. It will be seen that the plate 36 also forms the forward wall for the vertical braces 38 as well as the horizontal frame members 32 and 34.

Secured to the forward edges of the frame members 32 and 34 as well as the plate 36 is a plurality of arcuate teeth generally designated by the numeral 60.

It will be seen that the bottom plate of the bottom frame member 34 extends forwardly beyond the plate 36, as indicated by the numeral 62, and the upper plate forming the upper surface of the frame member 32 projects beyond the upper edge of the plate 36, as indicated by the numeral 64. These extensions actually form triangular gussets for engaging the side edges of the teeth 60, as illustrated in Figure 1. In order to form a smooth surface between the juncture of the gusset members 62 and 64 and the side edges of the teeth 60, a triangular plate 66 is provided with the base thereof secured to the edge of the triangular gussets, and the two edges thereof being secured, respectively, to the side edges of the teeth 60 and to the front surface of the plate 36 whereby the plates 66 form generally a smooth inclined surface so that soil and other objects will tend to slide off the plate 36 and not be collected on the ledge which would normally be formed by the gussets 62 and 64. These gussets 62 and 64 are rigidly attached to the side surfaces of the teeth 60, thereby rigidly securing the teeth to the plate 36 and to the frame members 32 and 34.

Each of the teeth 60 is provided with an arcuate concave forward surface 68 and an arcuate convex rear surface 70. The outermost teeth 60 are provided at their rear upper edge with a rearwardly extending plate 72 connected to a vertical plate 74 which forms substantially an extension of the plate 36 and the remote outer end of the plate 36 as well as the vertical portion 74 is provided with a rearwardly extending protecting plate 76 which forms an end plate for the attachment 10. The upper ends of the teeth 60 are interconnected by an elongated tubular pipe member 78 and the central two teeth are provided with an arcuate plate 80 which forms a protector for the cables 22. The tubular pipes 78 prevent material or articles from riding up the teeth 60 and over into the area between the attachment 10 and the tractor 12, thereby preventing damage to the cables 22 by such articles.

The outermost ends of the plate 36 are provided with an upwardly and rearwardly inclined reinforcing plate 82 interconnecting the front surface of the plate 36 and the upper surface of the elongated gusset 62 positioned exteriorly of the outermost teeth 60. This elongated gusset 62 terminates in a beveled sharpened edge 84 which is provided with a forwardly curved outer end 86. The ends of the reinforcing plate 82 as well as the gusset 62 are protected with a plate 88 which generally forms an end plate therefor. The forwardly curved portion 86 as well as the sharpened edge 84 facilitates the pushing of trees or stumps by the attachment 10. The outwardly extending portion will urge the trees inwardly against the outermost teeth 60 thereby preventing accidental disengagement of the tree from the sharpened edge or blade 84. This sharpened edge or blade 84 will also bite into the tree or stump, thereby preventing the entire device from riding up the tree since the cable 22 does not prevent the attachment 10 from moving upwardly.

Each of the teeth 60 is of hollow box-like construction which tapers in cross-sectional area from the bottom to the top and which may be constructed of an assembled or a one-piece tubular member of preferably rectangular cross-sectional shape. The lower end of each of the teeth 60 is provided with a pointed toe member 90 having an elongated upper portion 92 and a relatively short lower portion at 90 which forms generally an extension of the front surface 68 and the rear surface 70 of the tooth 60 and also receives the side members forming the tooth 60, thereby forming a completely enclosed structure that is welded or formed of one-piece construction. When desired, the tooth 60 may be removed and replaced by suitable welding operation or the like. While the hollow box-type construction of the teeth 60 provides adequate strength, it may be necessary or desirable to insert and weld within the hollow teeth 60 a box-like reinforcement member 94 which generally bridges the juncture between the tooth 60 and the toe 90 and is so positioned that it will reinforce the area of the tooth 60 which receives the greatest amount of strain. In this particular instance, the greatest amount of strain will be adjacent the point of contact between the teeth 60 and the lower frame member 34, and the reinforcement 94 generally bridges this point.

As illustrated in Figure 6, the outermost of the teeth 60 is provided with a generally vertically disposed blade 96 having a beveled and sharpened forward edge 98 which is generally concave, as illustrated in Figure 4. The concave sharpened edge 98 generally projects beyond the front surface of the toe member 90 for cutting roots 100 of a tree 102. As illustrated in Figure 7, the roots 100 may be cut on two or three sides of a tree, after which the tree trunk 102 may be engaged and pushed over by force exerted on the tree from the same side on which the roots 100 were cut. This greatly facilitates the process of pushing the trees over. Also, it is noted that the toe members 90 are provided with two inclined surfaces 104 as well as a generally pointed lower end 106 for engaging under stumps or rocks as well as under any obstructions in the soil.

The hollow tubular construction of the teeth 60 as well as the hollow tubular construction of the top and bottom frame members 32 and 34 and the connecting vertical brace box constructions 38 and the hollow pipe 78 provide a rigid and sturdy device for removing trees, stumps, brush, rock or any other similar obstructions from land and yet retains an extremely light weight for permitting a smaller tractor 12 to be utilized in conjunction therewith for doing a similar job. In practical operation, the tubular construction illustrated in the present invention has been tested and found to be stronger than a similar device constructed of solid members and the over-all weight thereof has been extensively reduced.

In operation, the tractor 12 is operated and the controls for the attachment 10 may be manipulated by the operator thereof in the usual manner for positioning the attachment 10 in the desired position. The teeth 60 may be utilized for grubbing or rooting and raking brush, stones or rocks, stumps, trees and other similar obstructions or foreign material normally found on land which it is desired to remove for using the land for other purposes. In the event it becomes necessary, the vertical blade 98 may be utilized for cutting roots 100 on one, two or three sides of a tree, and then, the blade 84 will be placed into contact with the tree trunk 102, thereby pushing against the tree from the same side or sides on which the roots have been cut wherein the sharpened edge of the blade 84 will bite into the tree, thereby preventing upward slippage of the blade 84 in relation to the tree trunk 102 and the outwardly curved portion 86 will hold the blade 84 in contact with the tree trunk 102, thereby permitting the device to be efficiently actuated. Also, the blade or knife 98 may be utilized for splitting tree stumps or the like for facilitating removal thereof. Due to the particular configuration of the teeth 60 which forms a portion of a circle, trees, stumps and the like will be rolled by the arcuateness of the teeth 60, thereby loosening and removing most of the dirt carried by the roots.

While smoothly curved teeth have been illustrated, it will be noted that straight or angulated teeth may be used which will employ the same box type construction. It is also pointed out that the vertical box-like braces 38 interconnecting the upper and lower box frames 32 and 34 form a rigid integral frame construction which will substantially prevent twisting of the frame construction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. An attachment for a vehicle comprising a pair of vertically spaced parallel frame members, a plate interconnecting the forward edges of said members, a plurality of spaced and curved teeth mounted on said members and extending above and below the same, the lower end of said teeth having a generally pointed ground penetrating toe for clearing land, means adjustably mounting said members on the vehicle, said members being of hollow rectangular construction thereby forming a rigid and lightweight attachment, a triangular reinforcing gusset interconnecting each side of the teeth to the upper and lower edges of the interconnecting plate, and an inwardly extending triangular plate having the base thereof secured to the forward edge of a gusset and the side edges attached to the interconnecting plate and the side of a tooth thereby forming a smooth reinforcement for increasing the lateral rigidity of the teeth and preventing material from hanging onto the teeth and interconnecting plate.

2. An attachment for a vehicle comprising a pair of vertically spaced parallel frame members, a plate interconnecting the forward edges of said members, a plurality of spaced and curved teeth mounted on said members and extending above and below the same, the lower end of said teeth having a generally pointed ground penetrating toe for clearing land, means adjustably mounting said members on the vehicle, said members being of hollow rectangular construction thereby forming a rigid and lightweight attachment, each of said teeth being of hollow box type construction, said teeth being arcuately curved and including a downwardly and forwardly curved ground engaging portion for rooting obstructions from the round, each of said hollow teeth having a straight hollow box-like reinforcement member secured therein in bridging relation to the point of attachment of the teeth to the lower frame member thereby rigidifying the teeth at the point which receives the greatest bending force.

3. An attachment for a vehicle comprising a pair of vertically spaced parallel frame members, a plate interconnecting the forward edges of said members, a plurality of spaced and curved teeth mounted on said members and extending above and below the same, the lower end of said teeth having a generally pointed ground penetrating toe for clearing land, means adjustably mounting said members on the vehicle, said members being of hollow rectangular construction thereby forming a rigid and lightweight attachment, said members projecting horizontally beyond the outermost teeth, and a horizontally disposed blade at each end of the lower member on the forward edge thereof for biting into a tree for pushing the same, each of said blades curving forwardly at its outer end for urging a tree inwardly and retaining the blade in engagement with a tree, each of said horizontal hollow members having an elongated reinforcing member extending diagonally between remote corners of said hollow members, a triangular reinforcing gusset interconnecting each side of the teeth to the upper and lower edges of the interconnecting plate, and an inwardly extending triangular plate having the base thereof secured to the forward edge of a gusset and the side edges attached to the interconnecting plate and the side of a tooth thereby forming a smooth reinforcement for increasing the lateral rigidity of the teeth and preventing material from hanging onto the teeth and interconnecting plate.

4. An attachment for a vehicle comprising a pair of vertically spaced parallel frame members, a plate interconnecting the forward edges of said members, a plurality of spaced and curved teeth mounted on said members and extending above and below the same, the lower end of said teeth having a generally pointed ground penetrating toe for clearing land, means adjustably mounting said members on the vehicle, said members being of hollow rectangular construction thereby forming a rigid and lightweight attachment, said members projecting horizontally beyond the outermost teeth, and a horizontally disposed blade at each end of the lower member on the forward edge thereof for biting into a tree for pushing the same, each of said blades curving forwardly at its outer end for urging a tree inwardly and retaining the blade in engagement with a tree, each of said horizontal hollow members having an elongated reinforcing member extending diagonally between remote corners of said hollow members, a triangular reinforcing gusset interconnecting each side of the teeth to the upper and lower edges of the interconnecting plate, and an inwardly extending triangular plate having the base thereof secured to the forward edge of a gusset and the side edges attached to the interconnecting plate and the side of a tooth thereby forming a smooth reinforcement for increasing the lateral rigidity of the teeth and preventing material from hanging onto the teeth and interconnecting plate, each of said teeth being of hollow box type construction, said teeth being arcuately curved and including a downwardly and forwardly curved ground engaging portion for rooting obstructions from the ground.

5. An attachment for a vehicle comprising a pair of vertically spaced parallel frame members, a plate interconnecting the forward edges of said members, a plurality of spaced and curved teeth mounted on said members and extending above and below the same, the lower end of said teeth having a generally pointed ground penetrating toe for clearing land, means adjustably mounting said members on the vehicle, said members being of hollow rectangular construction thereby forming a rigid and lightweight attachment, said members projecting horizontally beyond the outermost teeth, and a horizontally disposed blade at each end of the lower member on the forward edge thereof for biting into a tree for pushing the same, each of said blades curving forwardly at its outer end for urging a tree inwardly and retaining the blade in engagement with a tree, each of said horizontal hollow members having an elongated reinforcing member extending diagonally between remote corners of said hollow members, a triangular reinforcing gusset interconnecting each side of the teeth to the upper and lower edges of the interconnecting plate, and an inwardly extending triangular plate having the base thereof secured to the forward edge of a gusset and the side edges attached to the interconnecting plate and the side of a tooth thereby forming a smooth reinforcement for increasing the lateral rigidity of the teeth and preventing material from hanging onto the teeth and interconnecting plate, each of said teeth being of hollow box type construction, said teeth being arcuately curved and including a downwardly and forwardly curved ground engaging portion for rooting obstructions from the ground, each of said hollow teeth having a hollow box-like reinforcement member secured therein in bridging relation to the point of attachment of the teeth to the lower frame member thereby rigidifying the teeth at the point which receives the greatest bending force, the two outermost of said teeth having vertically disposed knives on the edge thereof, said knife having an arcuate sharpened front edge spaced beyond the front edge of the teeth for cutting roots and splitting stumps.

6. A tooth for use in combination with land clearing equipment comprising an elongated hollow member of polygonal cross-sectional shape, said member having a concave front surface and a convex rear surface and generally disposed in an upright position, and a pointed toe fixed to the bottom of said member for penetrating the ground, said toe member being thicker than said hollow member and having an elongated front portion and a relatively short rear portion attached to said hollow member, and a longitudinally disposed tubular reinforcing member bridging the portion of said hollow member to which the front portion of the toe member is attached and the point of attachment of the tooth in that portion of the hollow member receiving the greatest strain.

7. In combination with a tractor having a push yoke and means for controlling the elevation of the front portion thereof, the improvement which comprises: a land clearing unit including a frame having top and bottom cross-members connected by a plate, means for mounting said frame on the front portion of the tractor yoke, a plurality of curved teeth secured to the top and bottom cross-member, said teeth having upper ends projecting above the top cross-member, said cross-members and teeth being hollow box-like members, said cross-members having a longitudinal diagonal brace plate, said teeth having smooth front surfaces for providing rotational motion to the material gathered by the unit, said bottom member having a forwardly facing blade at its outer end for pushing over trees and stumps and the outermost teeth having a vertical knife for cutting roots and splitting stumps thereby facilitating the clearing of land.

8. A land clearing device comprising upper and lower box frame members, end box frame members interconnecting the end of the upper and lower frame members, a plate interconnecting all of the box frame members and forming the front wall of each box frame member, a longitudinal diagonal reinforcing plate in each of the upper and lower box frame members, vertical diagonal braces in said end box frame members thereby forming a rigid frame, means for adjustably mounting the frame on a pusher type vehicle, a plurality of downwardly projecting teeth, and means supporting said teeth from said interconnecting plate and said upper and lower box frames.

9. The combination of claim 8 wherein each of said teeth includes an elongated hollow member of rectangular cross-section, a downwardly projecting pointed toe rigid with the bottom end of the member and forming a continuation thereof, said toe having a front wall extending above the rear wall thereby vertically spacing the points of attachment to the hollow member with the front and rear walls of the toe being thicker than the front and rear walls of the hollow member.

10. A tooth for a ground agitating implement comprising an elongated upwardly extending hollow member having an arcuate longitudinal axis, said member having a rectangular cross-section, a pointed toe connected to the lower end of the hollow member and forming an arcuate continuation thereof, said hollow member having a front wall terminating above the lower end of the rear wall, said shoe having a front wall terminating above the upper end of the rear wall thereby spacing the points of attachment of the toe to the member, an elongated hollow reinforcement member having a straight longitudinal axis disposed within the tooth and bridging one of the points of attachment of the toe.

References Cited in the file of this patent

UNITED STATES PATENTS

| | | |
|---|---|---|
| 1,483,602 | Bloss et al. | Feb. 12, 1924 |
| 1,716,432 | Downie | June 11, 1929 |
| 2,303,415 | Williams | Dec. 1, 1942 |
| 2,371,549 | Sembler et al. | Mar. 13, 1945 |
| 2,491,208 | Price et al. | Dec. 13, 1949 |
| 2,494,225 | Blake | Jan. 10, 1950 |
| 2,701,591 | Kissner et al. | Feb. 8, 1955 |
| 2,735,197 | Struemph | Feb. 21, 1956 |

FOREIGN PATENTS

| | | |
|---|---|---|
| 80,317 | Norway | June 9, 1952 |
| 477,544 | Canada | Oct. 9, 1951 |